Figure 1:
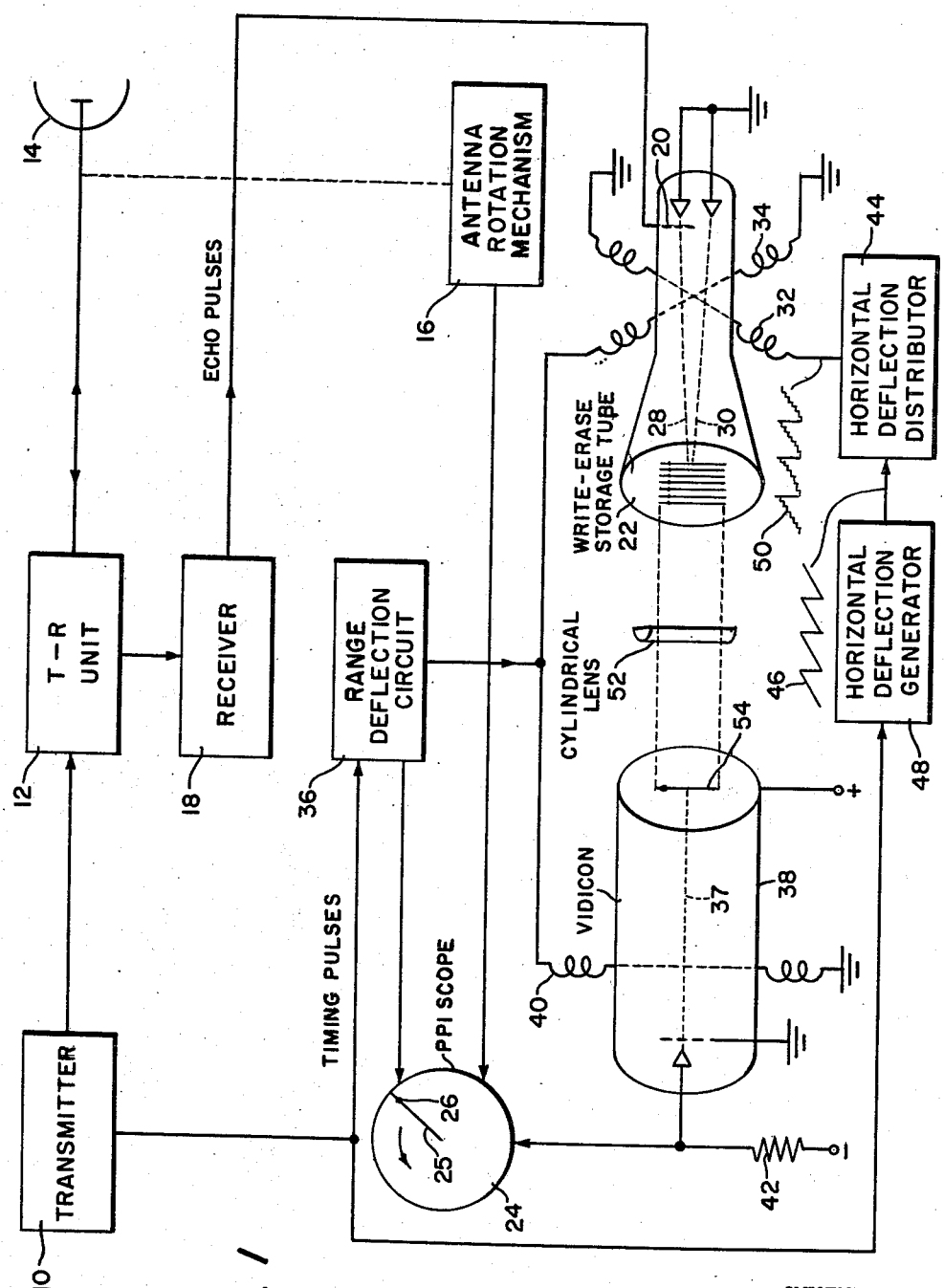

Dec. 3, 1963

L. V. SEARLE ETAL 3,113,311

RADAR INTEGRATING SYSTEM

Filed June 29, 1960

2 Sheets-Sheet 1

INVENTORS
LLOYD V. SEARLE
ROBERT L. HENDERSON
BY
AGENT
ATTORNEY

Dec. 3, 1963  L. V. SEARLE ETAL  3,113,311
RADAR INTEGRATING SYSTEM
Filed June 29, 1960  2 Sheets-Sheet 2

POINTS ALONG
EACH RANGE
SWEEP LINE

INVENTORS
LLOYD V. SEARLE
ROBERT L. HENDERSON
BY
AGENT

ATTORNEY

United States Patent Office 3,113,311
Patented Dec. 3, 1963

3,113,311
RADAR INTEGRATING SYSTEM
Lloyd V. Searle, 337 Appian Way, and Robert L. Henderson, 265 Carol Drive, both of Ventura, Calif.
Filed June 29, 1960, Ser. No. 39,741
9 Claims. (Cl. 343—17.1)
(Granted under Title 35, U.S. Code (1952), sec. 266)

The invention described herein may be manufactured and used by or for the Government of the United States of America for governmental purposes without the payment of any royalties thereon or therefor.

The present invention relates to radar systems, and more particularly to means for improving the detectability of weak reflections from a target in the presence of noise impulses which recur in a random or non-cyclic manner.

It is customary in radar systems of the type in which a signal is transmitted and received, such as by a rotating antenna, to employ means for permitting recognition of extremely weak target reflections through the expedient of raising the overall gain of the system to a point where internal or thermal noise originating in the receiving apparatus itself becomes perceptible on the display device. It is obvious that, under such circumstances, there will be occasions when the desired signal reflection is hidden or submerged in the traces that are produced by these noise impulses. Various expedients have been suggested for overcoming this difficulty, such as by making use of the natural integrating effect of rapidly recurring presentations to the retina of an observer, as well as by utilizing the inherent integrating property of the phosphor material employed in the cathode-ray tube of the display device. However, such attempts have not been completely successful due in part to the decay in intensity of illumination between successive sweep cycles of the cathode-ray tube. In addition, when the display device makes use of the principle of radial scanning (such as in the well-known PPI system), successive sweep lines are angularly off-set from one another and consequently little or no direct superimposition of the scanning spot takes place. For this reason, such systems inherently possess a rather low signal-to-noise ratio, and, unless the desired signal is of a rather strong nature, it becomes difficult (or impossible) to achieve a positive identification thereof.

It has been suggested that electrical means be provided to store several cycles of information (including spurious impulses representative of noise) through the medium of delay networks, and then to combine the stored energy in such a manner that the desired echo or signal pulses add up in phase, while the undesired noise impulses, due to their random nature, more or less neutralize or cancel one another. This in theory results in an essentially constant low noise threshold. However, these delay networks obviously increase the complexity of the radar apparatus, and are subject to fluctuations in output as a result of variations in temperature and as a result of component aging over extended periods of time. Consequently, such networks have not proven to be a satisfactory solution to the overall problem.

A further difficulty encountered in radar systems (of the type employing the above-mentioned PPI display) is that each line presentation thereon is subject to rather rapid fading during a complete rotation of the search antenna. Even if the antenna rotates at a relatively rapid rate, the repetition frequency of any presentation at a given location on the display device is still so low that undesired flickering is present unless long-persistence phosphors are employed. As a result, it becomes difficult to monitor the presentation for any extended length of time without subjecting the observer to eye strain and undue nervous tension. This can be circumvented to a degree by making use of phosphors of long persistence, but this results in no appreciable improvement in the signal-to-noise ratio.

The present concept makes use of the basic principle of signal integration, but in a preferred embodiment carries this out in a manner which permits the complex electrical circuitry of prior arrangements to be dispensed with. It has been found that equally satisfactory results can be obtained through optical integration of a signal display, since the change in position of a target image on the radar indicating device is normally very slight over a series of successive sweep cycles. Expressed more definitely, the detectability of a signal in the presence of random noise is increased in proportion to the square root of the number of successive sweeps which can thus be combined or integrated, as will later be demonstrated in connection with a description of FIGS. 2 and 3 of the drawings.

In one preferred embodiment of the present concept, a group of successive sweep lines are displayed on the face of a cathode-ray tube, each sweep representing in conventional fashion one pulse transmission cycle. Means are then provided for positionally off-setting or displacing each successive sweep line of the group from the immediately preceding one, so that the group as a whole forms a pattern having a predetermined geometrical configuration such for example as a rectangle. The cathode-ray tube possesses storage characteristics so chosen that the presentation remains throughout the development of the complete sweep pattern.

One form of cathode-ray device which may be utilized to create such a presentation incorporates a pair of electron scanning beams which are concurrently deflected so that the luminous pattern is developed by one of these beams while the remaining beam acts to cancel or erase any energy remaining in the phosphor region immediately in front of the trace-producing beam. In this manner, and assuming that the trace-shifting network associated with the tube is arranged to present a predetermined number of off-set traces during each complete display cycle, it will be seen that continuous storage of a chosen number of the most recent sweeps is obtained, while at the same time provision is made for erasing or canceling any energy remaining from the oldest sweep in the pattern just prior to the addition of the most recent one.

The scanning raster thus produced is then optically integrated so that each sweep line developed in the above manner is optically superimposed upon every other sweep line. In other words, a single linear display is developed in which the video amplitudes of corresponding points on each originally-developed sweep line become additive. Consequently, the target signal itself, which occurs at substantially identical points in each original sweep line, is effectively enhanced insofar as its visibility to an observer is concerned. However, the various noise impulses are not thus additive, inasmuch as they are of random nature and do not necessarily occur at corresponding time instants during successive sweeps in the originally-developed pattern. The result is that (in effect) the signal impulses are additive in phase, while the noise impulses are also additive but in an out-of-phase sense. The resulting ratio of signal to noise is therefore materially improved over that present in any particular one of the original sweep lines laid down on the display device.

The single linear trace mentioned above may be projected or focused upon the photo-cathode of a pickup tube such, for example, as a Vidicon; the output of the latter can then be applied to conventional display apparatus so that in effect the output of the Vidicon is substituted for the signal developed by a conventional radar receiver.

Summing up, therefore, applicants' system makes use of the principle of optical integration to cause linear traces developed on the screen of a cathode-ray tube to be individually presented on different portions of the screen during a number of successive range sweep cycles, and then these traces integrated in such fashion that the ratio between the illumination representative of a desired target and the illumination representative of undesired noise impulses is raised, thereby causing the signal to distinctly stand out from the noise and become more readily observable.

One object of the present invention, therefore, is to provide an improved form of radar system in which the signal-to-noise ratio is materially increased.

Another object of the invention is to incorporate in a radar system means for improving the detectability of a reflected signal by optically integrating successive cyclic indications in which the signal appears, regardless of the fact that such signal may in any single one of these indications be essentially obscured by the presence of undesired noise indications which occur in a random manner with respect to time.

A further object of the invention is to provide an improved type of radar system in which successive line sweeps on a cathode-ray tube are laterally offset from one another to form a two-dimensional geometric pattern, and then these line sweeps optically combined into a single linear trace in which corresponding points thereon are, in effect, integrated so that the respective indications representing the desired signal assume an additive relationship while indications representing random noise in effect possess an out-of-phase relationship.

Figure 2:
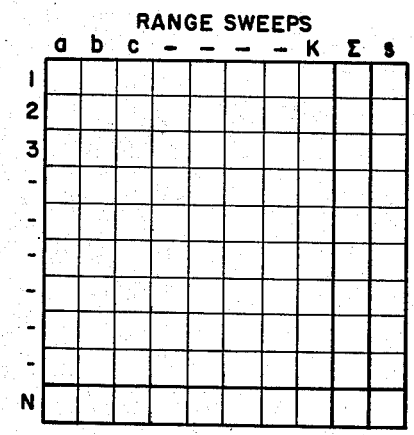

Other objects and many of the attendant advantages of this invention will be readily appreciated as the same become better understood by reference to the following detailed description when considered in connection with the accompanying drawings, wherein:

FIG. 1 is a schematic presentation of a radar system designed in accordance with a preferred embodiment of the present invention; and FIGS. 2 and 3 are graphs useful in explaining the principle of operation of the radar system of FIG. 1.

Referring now to the drawings, there is shown in FIG. 1 a radar transmitter 10 which may be of a conventional type supplying pulses of short duration and relatively high amplitude through a transmit-receive switching circuit 12 to an antenna 14. The latter is designed for rotation about a vertical axis by means of a standard mechanical driving mechanism 16. Energy transmitted by antenna 14 and reflected from a target is received by the antenna and applied through the unit 12 to a receiver 18 which detects the signal in customary fashion. The echo pulses so detected by receiver 18 are applied to the control grid 20 of a storage cathode-ray image-reproducing tube 22 which is of the "write-erase" type. As is well known in the art, the transmit-receive switching unit 12 serves the purpose of isolating the receiver 18 from transmitter 10 during the time that a pulse is generated by the latter and sent out from anenna 14.

The radar sysem of the drawing includes a more or less conventional cathode-ray display device (which has been illustrated as a so-called PPI scope 24) and this display device acts to develop a series of line scans originating at the axis of the cathode-ray tube and extending radially therefrom, each such scan or trace being initiated by the generation of one of the pulses developed by transmitter 10. Consequently, such pulses also serve as reference or timing pulses for the operation of the display device. The radial traces thus successively developed during operation of the radar system are caused to be angularly offset from one another about the axis of the cathode-ray tube by synchronizing the tube's deflection system with that of the antenna rotation mechanism 16. Therefore, the radial direction of any particular trace developed on the PPI scope 24 (such as the trace 25) always accurately represents the direction of the rotating antenna 14 at that same particular instant of time. In conventional radar systems, any returned energy picked up by antenna 14 and supplied to receiver 18 would be applied directly to the PPI scope 24 so as to generate thereon a fluorescent spot or "pip" 26 of a certain intensity. In applicants' system, the apparent intensity of this spot 26 is increased, and the detectability thereof facilitated by incorporation in the radar system of means which will now be set forth in dettail.

As previously mentioned, the image-reproducing tube 22 is of a type which makes use of two independently-developed cathode-ray beams 28 and 30. The electron beam 28 is intended to develop a luminous spot on the cathode-ray tube screen whenever it impinges the phosphor coating of the screen. The remaining cathode-ray beam 30 is intended to erase or neutralize any energy which may remain on that particular portion of the screen impinged by such beam. As used in the present invention, the "erase" beam 30 is deflected in step with the "writing" beam 28 and immediately precedes the latter. It accordingly removes from the tube's screen any energy which might result in the development by the writing beam 28 of an indication which is not truly representative of the information to be displayed.

The image-reproducing tube 22 is provided with the usual set of "horizontal" deflection coils 32 and "vertical" deflection coils 34. The latter are energized by current of generally saw-tooth wave form generated in a range deflection circuit 36 which is synchronized in its operation by pulses received from transmitter 10, so that, as above brought out, such pulses also perform a "timing" or reference function. The output of this range deflection circuit 36 not only energizes the deflection coils 34 of the image-reproducing tube 22 but is also applied to "trigger" the radial deflection of each trace 25 developed on the PPI scope 24. In addition, each cycle of the wave from circuit 36 causes a linear (vertical in the drawing) deflection of the electron scanning beam 37 of a cathode-ray storage tube 38 which may be of the type known in the art as a Vidicon. This tube is a more or less conventional television pickup device having means (the deflection coil 40) for deflecting the scanning beam 37 in only a vertical direction. Although the deflection coils 40 are shown as being energized from the range deflection circuit 36, it will later be recognized that the frequency of scanning the light-sensitive screen of the Vidicon does not have to be identical to the range deflection frequency of the storage tube 22. The energy output of the Vidicon 38 is developed across an output resistor 42 and applied to the PPI scope 24 to cause the generation of the spot or "pip" 26 in the manner described above.

It will now be seen that the range deflection circuit 36 corresponds to the vertical deflection circuit of a television receiver in that it results in the electron scanning beams 28 and 30 of tube 22, as well as the scanning beam 37 of tube 28, being deflected in a vertical direction as viewed in the drawing. This same range deflection circuit 36 preferably but not necessarily results in a radial movement of each trace 25 generated on the PPI scope 24.

In accordance with the invention concept, the successive traces developed by the scanning beam 28 of tube 22 are caused to be cyclically displaced or offset in a horizontal direction, and this cyclic or step-by-step displacement is produced through the action of a horizontal deflection distributing circuit 44. As employed in the arrangement of the drawings, the horizontal deflection distributing circuit 44 is of any conventional type which modifies the saw-tooth wave form 46 of current (or voltage, depending on the particular type of cathode-ray tube deflecting means employed) received from a deflection generator 48 so that the output of distributor 44 has the configuration depicted by the reference numeral 50, being in the form of a series of discrete steps of increasing amplitude. This wave 50 is fed to the deflection coils 32 of tube 22. Each "step" action by the distributing circuit 44 is effected through the reception thereby of a timing pulse from transmitter 10, such that successive timing pulses result in successive incremental movements of both the electron beams 28 and 30 horizontally across the face of tube 22. This produces a series of "vertical" traces which are laid down side-by-side in parallel fashion in the manner brought out in the drawings.

In accordance with an important feature of the present concept, these traces laid down in spaced-apart parallel fashion on the screen of tube 22 are condensed in a single dimension only by means of an optical system which may, for example, include a cylindrical lens 52. This lens 52 is consequently known as an anamorphote lens, and in effect focuses the two-dimensional image formed on the screen of tube 22 into a single linear trace 54 on the photo-cathode of the Vidicon 38, this trace 54 being made up of all of the individual traces developed on tube 22 superimposed each upon the others. Thus the trace 54 may be said to comprise a point-by-point optical integration of the light output from all of the individual trace lines developed on the storage tube 22.

The trace 54 is scanned by the electron beam 37 of the Vidicon. The desired target indication, which has been intensified in trace 54 with respect to the same target indication as it appears in any single trace developed on the screen of the storage tube 22, is represented by a stronger electrical signal with respect to noise in the output of tube 38, and hence the spot 26, which is generated on the PPI scope 24, possesses a higher degree of detectability than would the same spot 26 were it to be developed by direct application to scope 24 of the echo signal detected by receiver 18.

As a consequence of employing the additional components 22, 38, 44 and 52, therefore, the signal output (and hence the range) of the radar receiver is increased through the principle of optical integration, and furthermore the signal-to-noise ratio is materially improved. As will now be appreciated, this is achieved by averaging out the random noise impulses (which do not necessarily occur at corresponding points on successive line scans of tube 22) while the desired signal indications (which do occur at essentially constant time intervals from the initiation of each successive sweep cycle) do combine in an additive sense. Consequently, the overall level of noise is reduced (with respect to signal brightness) as compared to conventional radar receivers where a target indication is often wholly or partially obscured by noise generated within the receiver circuitry itself.

The deflection distributor 44 may take the form of an electronic commutator which is cyclically triggered by timing pulses from transmitter 10 to yield incremental increases in deflection current through coils 32, these shifts occurring in discrete steps so as to cause the successive sweep lines to be distributed side-by-side within a given raster area on the screen of the storage tube 22. Assuming that the number of sweep lines to be displayed in this manner has been predetermined, the deflection of distributor 44 is so arranged as to permit the generation of this predetermined number of lines as a complete display cycle. The scanning beams 28 and 30 then return to their starting point for the production of another series of traces, the erasing beam 30 deleting the oldest sweep line as each new sweep line is added by the writing beam 28. Consequently, an observer of the PPI scope 24 is presented with a "running average" of both signal and noise over a complete cycle made up of all of the lines chosen for integration. It is obvious that, as each new sweep line appears, this "average" varies, and such variation occurs at the repetition frequency of the pulses generated by transmitter 10.

For optimum operation, the storage tube 22 should be of relatively high resolution (in other words, small spot size) and should also have a satisfactorily wide dynamic range so that relatively minor variations in signal strength can be accurately reproduced. It is also obvious that the line-by-line erasure brought about by the beam 30 should be synchronized with, and occur at the same speed as, the deflection of the writing beam 28.

Throughout the present description of the operation of the system of FIG. 1 of the drawings, the terms "line scan" and "sweep line" are intended to designate the movement of each electron beam of the cathode-ray tubes 22 and 38 during the period between the transmission of successive pulses from the radar antenna 14. In other words, this movement of any cathode-ray beam is that which occurs during the each operational cycle of the range deflection circuit 36. Such terms, therefore, are not necessarily related to the movement of the radar antenna, even though a complete rotation of the latter is in some cases designated as an azimuthal "sweep" or "scan." The frequency of presentation of each trace 25 on the PPI scope 24 is likewise not necessarily time-related to the development of the single linear trace 54 on the Vidicon 38, since the storage action of the latter permits the information contained in trace 54 to be "read out" at either a faster or slower rate than that at which each individual trace is produced on the fluorescent screen of the write-erase tube 22.

It should be noted that, when the system of the present invention is employed, any integration effects which are inherent in conventional radar display devices due to overlapping of the scanning spot on the phosphor screen, or due to the rapid recurrence of images presented to the eye of an observer, will continue to be present. These factors are in addition to those produced by the optical integrating apparatus 22, 38 and 52, i.e., all of the independent integrating effects mutually combine in an additive sense.

It is true that under conditions when the target is in fairly rapid motion there will be a slight delay introduced into the radar display. This lost time is of no particular consequence to the radar operator, but, where extreme accuracy is desired, a slight adjustment may be made in the time of occurrence of the control pulses fed to the PPI scope 24 from the antenna rotation mechanism 16.

Since the disclosed circuitry materially improves the detectability of reflected energy in a radar system, it results in an extension of the range of existing apparatus by enabling weak or low-amplitude signals to be separated from random noise pulses which might otherwise cause this signal to remain unnoticed.

While a cylindrical lens has been shown as the means for optically condensing (in one dimension) the image produced on a storage tube, it is apparent that other optical components will serve a similar purpose. The main consideration is that a number of separate indications are optically superimposed one upon the other by means of the disclosed apparatus, and hence variations in illumination of corresponding points in each individual line of the original raster are "averaged out" through this act of superimposition. The resulting linear presentation thus includes a "reinforcement" of information which it is desired to observe, and a corresponding decrease in illumination representing objects the only effect of which is to preclude a clear understanding of the overall picture presented on the screen of the radar receiver.

The relative distribution of signal and noise is graphically brought out in FIGS. 2 and 3 of the drawings. For example, the chart of FIG. 2 illustrates a series of range sweeps plotted against the points along each such range sweep line. It will be assumed that $s$, the average value of any one point over $k$ sweeps, is equal to $$\frac{\Sigma}{k}$$

The noise distribution (M) for any one sweep is $$M_i = \overline{X}_i$$

and $$\sigma_i = \sqrt{\Sigma \frac{x^2}{N}}$$

where $\bar{X}$ = the amplitude or brightness of each point on sweep line
$\sigma$ = standard deviation about the mean.

Assuming that each sweep represents a very large sample of the total noise distribution, then the $\sigma$'s of all columns of FIG. 2 are equal:

$$\sigma_a = \sigma_b = ---- = \sigma_k = \sigma$$

The means of the columns are also equal:

$$M_a = M_b = ---- = M_k = M$$

Now, for the $\Sigma$ column, $$M_\Sigma = M_a + M_b + --- + M_k = kM$$

For the $s$ column, $$M_s = k \frac{M}{k} = M$$

For the $\underline{\Sigma}$ column, $$\sigma_\Sigma = \sqrt{\sigma_a^2 + \sigma_b^2 + --- \sigma_k^2 + 2r_{ab}\sigma_a\sigma_b + ---- + 2r_{jk}\sigma_j\sigma_k}$$
$$= \sqrt{k\sigma^2 + k(k-1)\bar{r}\sigma^2}$$

Since $\bar{r}$ (the mean of all cross-correlations) is zero, then $$\sigma_\Sigma = \sigma\sqrt{k}$$

For the $s$ column, $$\sigma_s = \sigma\sqrt{\frac{k}{k}} = \frac{\sigma}{\sqrt{k}}$$

Figure 3A:
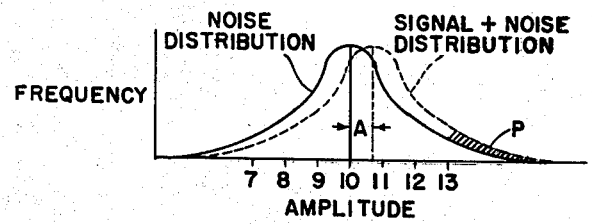

FIG. 3(a) shows the signal-to-noise distribution for a single sweep line as developed on the storage tube 22 of FIG. 1, where A is a weak signal which appears consistently at the same point on each of the $k$ sweeps. With A (the signal strength) equalling 0.8, M being equal to 10, and $\sigma$ to 1.0, the amplitude vs. frequency characteristics of both noise distribution (solid line) and signal-plus-noise distribution (broken line) are as illustrated. These curves show that $p$ (the probability of signal acceptance) has a value of .014.

Figure 3B:
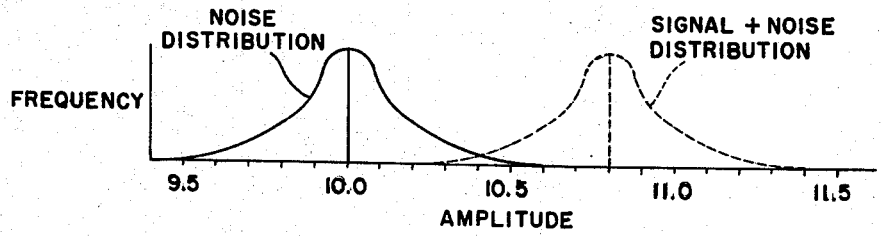

In FIG. 3(b), the $s$ distribution is set forth. Assuming $k$ equal to 100, it is seen that the probability of signal acceptance is raised to 999 parts in 1,000 by integrating these 100 sweep lines in the manner taught by the present disclosure. Obviously such an increase materially extends the effective range of the radar apparatus.

If desired, the optical integrating apparatus of the above-described embodiment may be replaced by a rotating wide-band magnetic drum. This drum is associated with a plurality of rows of writing, erasing and readout heads, one set of such heads being utilized for each of the line-scans to be integrated (such as the number of lines laid down side-by-side in parallel relationship on the storage tube of the drawings). The horizontal deflection distributor will activate the erase and write heads in the same manner as that described for control of the storage tube illustrated. Thus, a predetermined number of cycles of operation of the radar system results in the establishment of a "magnetic memory" embracing the information obtained over this time period. The reading heads are disposed to pick off all cycles of information simultaneously during each rotation of the drum, and a voltage representing the output of all heads in parallel is applied as an integrated signal to the display device of the radar. The end result is thus similar to that obtained by use of the optical integrating apparatus set forth in the drawings.

Obviously many modifications and variations of the present invention are possible in the light of the above teachings. It is therefore to be understood that within the scope of the appended claims the invention may be practiced otherwise than as specifically described.

We claim:

1. In a radar system: apparatus for facilitating the separation of one or more desired target indications developed on the screen of a radar display device from other indications produced by noise impulses of a random nature which are intermixed with the said target indications, said apparatus including means for developing a separate range scan for each pulse transmission cycle of the said radar system, a storage-type cathode-ray image-producing tube, means for displaying the characteristics of each developed range scan as a linear trace on the screen of said cathode-ray image-producing tube, a time-distribution network for causing the said linear traces to be positionally displaced side-by-side in parallel fashion with respect to one another over a predetermined number of range scans of the said radar system, the said positional displacement thus occurring in a direction normal to each linear trace and within the plane of the said cathode-ray image-producing tube screen, a pick-up tube of the storage type having a photo-cathode and means for periodically scanning said photo-cathode to develop output signals, optical means for combining the positionally-displaced traces developed on the screen of said cathode-ray image-producing tube so that they are in effect super-imposed as a single linear representation upon the photo-cathode of the said pick-up tube, the scanning means of said pick-up tube operating to scan the said photo-cathode only in a single direction which coincides with the linear representation developed thereon by said optical means, and a circuit for applying the output signals from said pick-up tube to the display device incorporated in said radar system.

2. The combination of claim 1, in which the optical means for superimposing the positionally-displaced parallel traces developed on the screen of the cathode-ray tube includes means for condensing in one of two mutually perpendicular directions lying in the plane of said screen the light representative of such traces, the said condensing means being effective in a direction normal to the direction of each parallel trace.

3. The combination of claim 2 in which said condensing means comprises a cylindrical lens.

4. In a radar system which includes a transmitter for generating a series of time-spaced energy pulses, a cyclically-scanning antenna associated with said transmitter for radiating said energy pulses in a directive beam and for receiving target-reflected echoes and a receiver for detecting said target-reflective echoes, said receiver incorporating a first cathode-ray tube acting as a display device, the combination of a second storage cathode-ray tube to which the received echo pulses are applied; said second storage cathode-ray tube including means for developing on the fluorescent screen thereof a linear trace for each energy pulse radiated by said antenna, means for applying to said second storage cathode-ray tube a displacement voltage the effect of which is to positionally offset each linear trace developed by said tube from the immediately preceding trace, this displacement occurring in a lateral direction with respect to each previously-developed linear trace so that in effect a raster is produced on the storage cathode-ray tube screen in which the said line traces lie side-by-side in essentially parallel relationship, the number of line traces constituting such raster being predetermined in accordance with the characteristics of said displacement voltage, said second storage cathode-ray tube also including means for erasing the most time-remote line trace prior to the development of an additional trace as soon as the said predetermined number of traces to make up said raster have been laid down, a third cathode-ray tube of the pick-up type having a photo-sensitive screen and disposed to receive light emitted by the screen of said second cathode-ray tube, optical means interposed between said second and third cathode-ray tubes for focusing the light emitted by said second cathode-ray tube in but one of two mutually perpendicular directions so that the series of parallel traces developed on the screen of the second cathode-ray tube are in effect superimposed one upon the other as a single linear representation upon the photo-sensitive screen of the said pick-up tube, means for scanning the single representation appearing on the said photo-sensitive screen in a manner coinciding therewith to produce an output signal, and means for applying the signal thus produced by the said pick-up tube to the display device of the radar system so as to enhance the characteristics of the said target reflected echos as they may appear thereon.

5. The combination of claim 4 in which the second cathode-ray tube incorporates two scanning beams one of which acts to develop visible traces on the fluorescent screen thereof and the other of which acts to erase selected ones of such developed traces to thereby permit additional information to be displayed in the screen area where such erasure occurs, the deflection of both such scanning beams occurring in simultaneous fashion.

6. The combination of claim 4 in which the optical means for focusing the light emitted by said second cathode-ray tube onto the photo-sensitive screen of the said pick-up tube includes a cylindrical lens the longitudinal axis of which is essentially parallel to each of the parallel traces forming the raster produced on the second cathode-ray tube screen.

7. In a radar system: means for facilitating the recognition of an image representing energy reflected from a desired target in the presence of noise, both the reflected energy and the noise acting to develop visible indications on the screen of a display device, the visible indications produced by such noise tending to obscure or otherwise render difficult of detection the desired target indications, means for receiving and storing energy representative of each cycle of operation of the said radar system, the energy thus stored including both desired and undesired portions respectively representative of the target indications and of the spurious noise impulses, and means for integrating the energy thus received and stored over a predetermined number of cycles of operation of said radar system, said integrating means including means for eliminating from the integrated output thereof energy received and stored prior to the start of a period the duration of which is determined by the said predetermined number of cycles of operation of said radar system, whereby the energy representative of the desired target reflected impulses will be essentially additive in phase while the energy representative of the undesired noise impulses will not tend to be thus additive due to the random time occurrence of such noise impulses, the overall signal-to-noise ratio of the radar system as a result of the action of the said integrating means thus being improved to enable the desired target indications and to be more readily recognized by an observer of the radar display device.

8. The combination of claim 7, in which said integrating means includes an image-reproducing device upon which the energy representative of each of the said operational cycle of said radar system is optically displayed, means for selectively condensing in but one of two mutally perpendicular directions the light representative of each such cycle of optically-displayed energy, and means for further scanning the image formed by the selectively condensed light to develop output signals.

9. A combination of claim 8, in which the said image-reproducing device for optically displaying the cyclically-developed energy includes a cathode-ray tube having a fluorescent screen upon which a line trace representative of each cycle of operation of the said radar system is developed, and means for positionally displacing each such line trace so generated on the said screen, the said means for selectively condensing the light developed on the screen of said cathode-ray tube including means for superimposing each of said line traces one upon the other so that the single line trace resulting from such superimposition contains target energy which is effectively additive and also other energy of an undesired nature, which, due to its occurrence at random time intervals, is not thus additive, whereby the ratio between visible indications respectively representative of desired and undesired energies is effectively increased.

References Cited in the file of this patent
UNITED STATES PATENTS

| | | |
|---|---|---|
| 2,412,669 | Bedford | Dec. 17, 1946 |
| 2,820,921 | McGee et al. | Jan. 21, 1958 |
| 2,956,274 | Smythe | Oct. 11, 1960 |
| 2,979,714 | Wallace | Apr. 11, 1961 |